United States Patent
Dehaan et al.

(10) Patent No.: US 10,157,296 B2
(45) Date of Patent: Dec. 18, 2018

(54) OPTICAL AND COPPER TRANSCEIVER IDENTIFIER

(71) Applicant: INTERNATIONAL BUSINESS MACHINES CORPORATION, Armonk, NY (US)

(72) Inventors: David F. Dehaan, Tucson, AZ (US); Shelly L. Gerndt, Tucson, AZ (US); Peter W. Wendler, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/853,734

(22) Filed: Sep. 14, 2015

(65) Prior Publication Data

US 2016/0004888 A1    Jan. 7, 2016

Related U.S. Application Data

(62) Division of application No. 11/693,049, filed on Mar. 29, 2007.

(51) Int. Cl.
*G06K 7/04* (2006.01)
*H01R 31/06* (2006.01)
*G06K 7/10* (2006.01)

(52) U.S. Cl.
CPC ............ *G06K 7/04* (2013.01); *H01R 31/065* (2013.01); *G06K 2007/10504* (2013.01)

(58) Field of Classification Search
CPC .................. G02B 6/4201; G11C 5/141; H04N 2201/0087

USPC ......................................................... 235/439
See application file for complete search history.

(56) References Cited

U.S. PATENT DOCUMENTS

| | | |
|---|---|---|
| 5,768,689 A | 6/1998 | Borg |
| 6,711,547 B1 * | 3/2004 | Glover .................. G06F 19/322 600/300 |
| 6,917,595 B2 | 7/2005 | Chang et al. |
| 6,976,794 B1 * | 12/2005 | Meyer .................. G02B 6/4201 385/88 |
| 2004/0019459 A1 | 1/2004 | Dietz et al. |
| 2004/0121733 A1 | 6/2004 | Peng |
| 2006/0046736 A1 | 3/2006 | Pering et al. |
| 2006/0067688 A1 | 3/2006 | Inman et al. |

(Continued)

OTHER PUBLICATIONS

"Innovative Products", Lightwaves2020 Inc., Transceiver Tester, May 2006.

(Continued)

*Primary Examiner* — Thien M Le
*Assistant Examiner* — Tae W Kim
(74) *Attorney, Agent, or Firm* — Griffiths and Seaton PLLC

(57) ABSTRACT

A hand-held-transceiver identifier device includes a processor device contained in a housing. A port is contained in the housing to receive a transceiver. A display is contained in the housing. Upon insertion of the transceiver in the port, the device interrogates the transceiver to obtain specification information. A computer-implemented method of identifying a transceiver device detects an insertion of the transceiver device, interrogates the transceiver device to obtain specification information, and detects a removal of the transceiver device.

10 Claims, 4 Drawing Sheets

(56) References Cited

U.S. PATENT DOCUMENTS

| 2006/0171683 | A1 | 8/2006 | Battaglia et al. |
| 2007/0224884 | A1* | 9/2007 | Engel ................ H01R 13/6658 439/607.01 |
| 2007/0250786 | A1 | 10/2007 | Jeon et al. |
| 2007/0297349 | A1* | 12/2007 | Arkin ................ H04L 12/66 370/255 |

OTHER PUBLICATIONS

Zhang et al., "Low Cost Testing of Quadruple Band GSM Tranceivers", International Test Conference—Texas Instruments, Inc., 2005, Paper 17.1.

* cited by examiner

OPTICAL AND COPPER TRANSCEIVER IDENTIFIER

CROSS-REFERENCE TO RELATED APPLICATIONS

This Application is a Divisional Application of U.S. patent application Ser. No. 11/693,049, filed on Mar. 29, 2007, the contents therein hereby incorporated by reference.

BACKGROUND OF THE INVENTION

Field of the Invention

The present invention relates in general to electronic devices, and more particularly to optical or copper transceiver identifiers that are affixed to computing devices.

Description of the Prior Art

Communication technologies involving so-called "optical transceivers" or "copper transceivers" are employed in a wide variety of communication environments. Examples of such communication environments include, but are not limited to, telecommunications, networking, data communications, industrial communication links, medical communications links, etc. In networking environments, fiber optics have traditionally been employed in the network core as long-haul backbones. More recently, fiber optic technologies have been implemented at the network edge, e.g., metropolitan area network ("MAN") and local area network ("LAN") environments. Examples of other environments in which such communication technologies are being deployed include network operation centers, corporate network backbone, central offices, and edge/core aggregation points.

In a communication environment such as a large datacenter or testing environment, a large number of different types of transceivers can be found. These transceivers can vary by vendor, speed, wavelength, and operating range.

In the current art, the identification of these varying characteristics can only be performed by physically checking an associated label located on the respective transceiver. However, labels currently contain varying amounts of information, from a simple label having a part and serial number, to a more detailed label with supported speeds and wavelength. Any information not included on the respective label must be looked up in a reference publication. For a large number of unknown transceivers, the process of identifying varying characteristics in this manner can be time and resource consuming.

SUMMARY OF THE INVENTION

In light of the foregoing, a need exists for an apparatus and method of identifying an optical or copper transceiver which does not require the physical checking of a label, or the research of specifications in a reference publication. The apparatus should be compatible with a wide variety of existing form factors and standards to make an implementation cost-effective and efficient.

Accordingly, in one embodiment, the present invention is a hand held transceiver identifier device, comprising a processor device contained in a housing, a port contained in the housing to receive a transceiver, and a display contained in the housing, wherein, upon insertion of the transceiver in the port, the device interrogates the transceiver to obtain specification information.

In another embodiment, the present invention is a computer-implemented method of identifying a transceiver device comprising detecting an insertion of the transceiver device, interrogating the transceiver device to obtain specification information, and detecting a removal of the transceiver device.

In still another embodiment, the present invention is a method of manufacturing a hand-held transceiver identifier device comprising providing a processor device contained in a housing, providing a port contained in the housing to receive a transceiver, and providing a display contained in the housing, wherein, upon insertion of the transceiver in the port, the device interrogates the transceiver to obtain specification information.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENT

Figure 1:
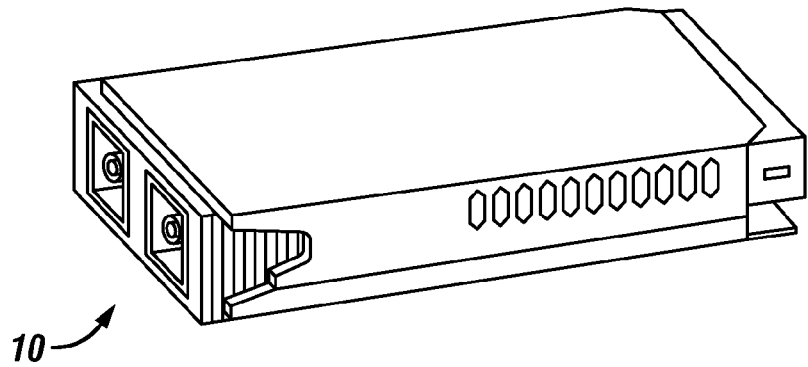
FIG. 1 illustrates an exemplary optical transceiver device.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates a transceiver device 10 compatible with a gigabit interface converter (GBIC) interface. Device 10 may be a Broadcom® Gigabit copper transceiver device, part number BCM5421S. In other embodiments, devices 10 can be transceiver devices compliant with small form factor pluggable (SFP) interfaces, such as an Intel® TXN3115D2 optical transceiver, or compliant with an XFP interface.

Device 10 can include specifications which vary according to the device 10. For example, the TXN3115D2 device 10 operates at a wavelength of 850 nanometers (nm) at 4.25 gigabits-per-second (Gbps) (4× Fibre Channel rate). Additional specification information can include the aforementioned vendor, part number, supported speed, and wavelength information, and further include a respective serial number and supported maximum distance. However, other information may be also relevant to the device 10.

Figure 2:
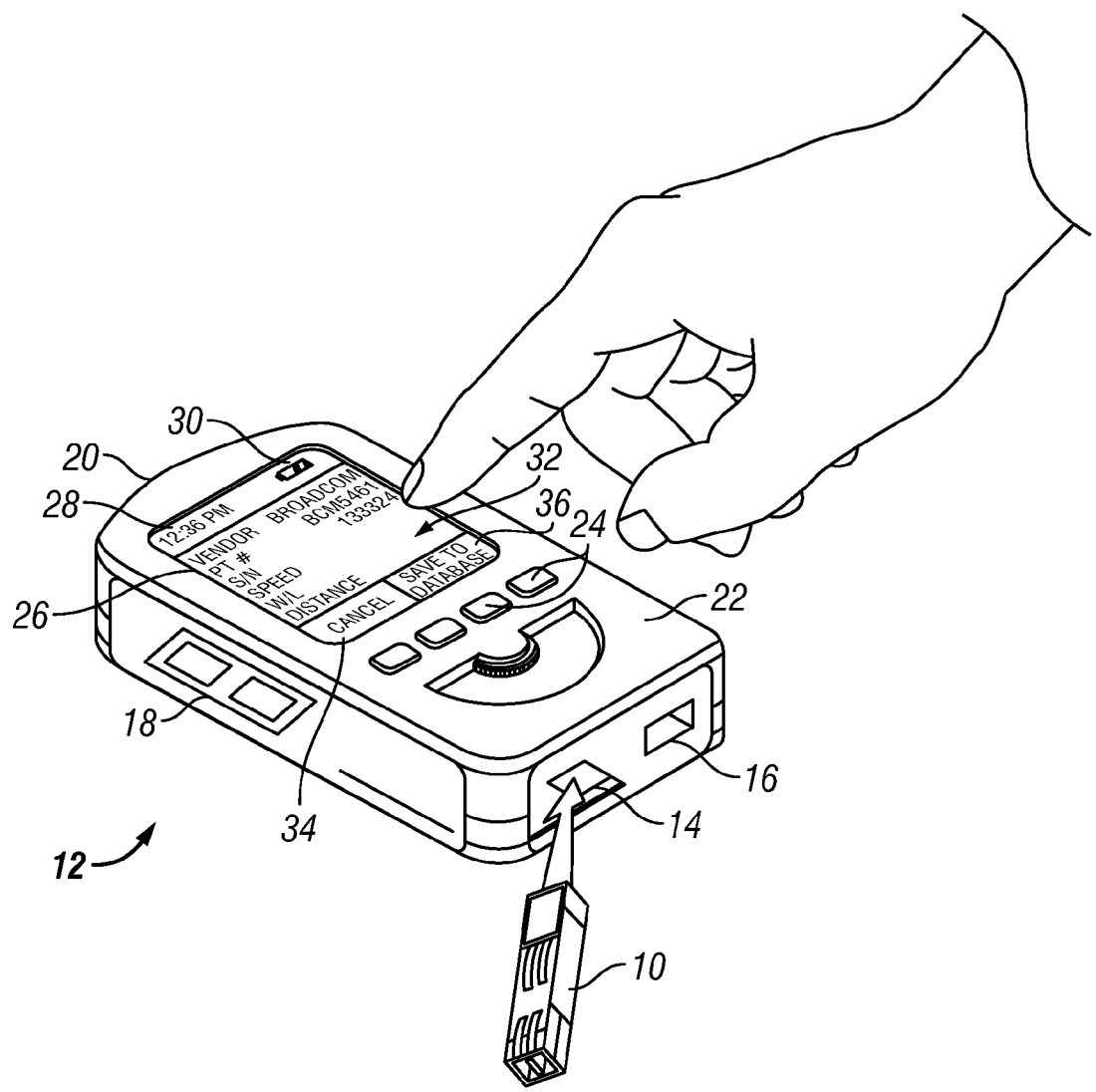
FIG. 2 illustrates a transceiver identifier device according to the present invention.

Turning to FIG. 2, an example of a hand-held transceiver identifier device is depicted according to the present invention. Identifier device 12 includes a SFP port 14, an XFP port 16, and a GBIC port 18. SFP port 14 is shown receiving a transceiver device 10. In a separate embodiment, a single port could be adapted to receive a variety of transceiver devices 10 having varying form factors. Ports 14, 16, and 18 are contained within housing 20. The top surface 22 of a housing 20 includes selection buttons 24 and a display 26. Display 26 can include such display devices as a liquid crystal display (LCD) 26 and similar displays that are known in the art.

Display 26 can include a so-called "touch screen" functionality to allow a user to select menu features or perform tasks using the identifier device 12. Display 26 can also incorporate a graphical user interface (GUI) to present information to a user in accordance with certain functionality for a particular application. Device 12 can be powered by any method known in the art, for example using a set of AA or AAA battery power sources (not shown).

Figure 3A:
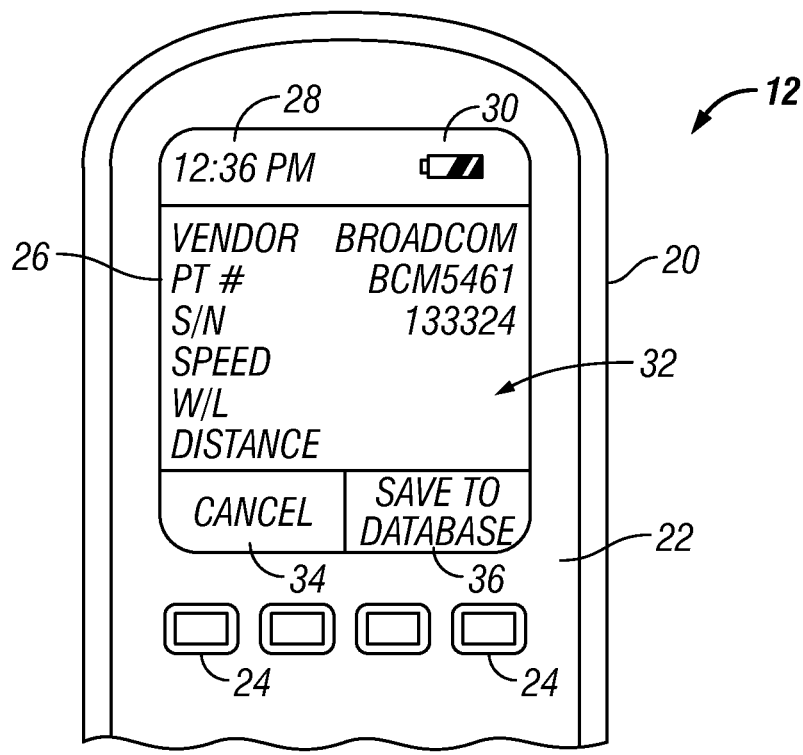
FIG. 3A illustrates a first exemplary display screen of the transceiver identifier device illustrated in FIG. 2.

FIG. 3A illustrates a first exemplary screen which can be presented with display 26. Display 26 includes several segmented portions as will be described and are presented according to an example GUI. A time window 28 displays a current time. Battery indicator 30 displays a battery strength.

Window 32 displays specification information associated with a particular transceiver, such as vendor, part number (shown here as PT #), serial number (shown here as S/N), supported operating speed, wavelength (shown here as W/L), and supported distance. Below window 32, cancel touch-screen button 34 allows a user to return to a previous menu. Save-to-database touch-screen button 36 allows a user to save the displayed specification information to a respective database. As one skilled in the art will appreciate, display 26 and windows 28, 30, 32, and buttons 34 and 36 can be easily tailored via onboard software and/or firmware to suit a particular application.

FIG. 3A illustrates the display of specifications relating to an exemplary copper transceiver device 10. A Broadcom® BCM5461 having serial number 133324 has been inserted into the SFP port 14 in the device 12. In some cases, specification information such as wavelength will not be applicable. Again, additional information can be relevant to a particular transceiver 10 and can also be presented on display 26.

Figure 3B:
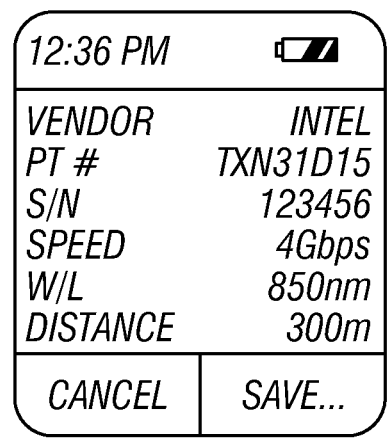
FIG. 3B illustrates a second exemplary display screen of the transceiver identifier device illustrated in FIG. 2.

An additional example of specification information as presented on display 26 is illustrated by FIG. 3B. Again, windows 28, 30, 34, and buttons 34, and 36 are shown. In the instant example, an Intel® TXW31015 optical transceiver having serial number 123456 has been inserted. The speed is displayed to be 4 Gbps, with an associated wavelength of 850 nm and a supported distance of 300 m.

Figure 4A:
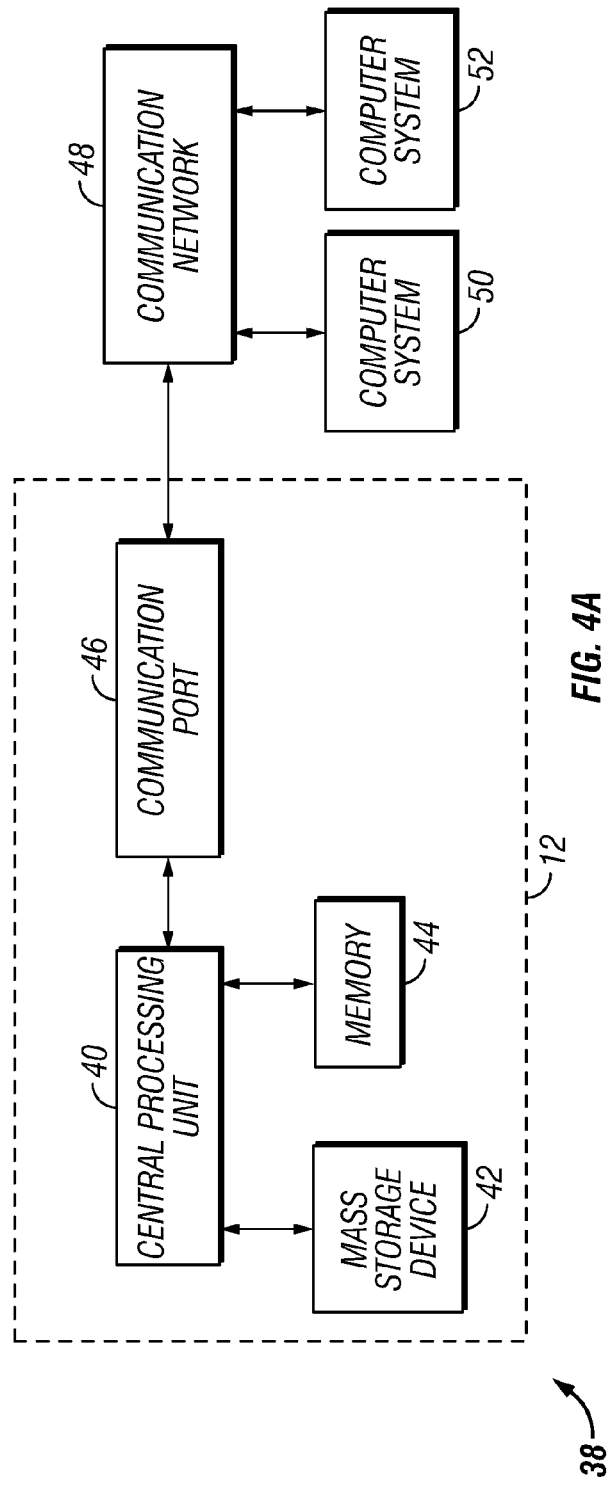
FIG. 4A illustrates exemplary subcomponents of a transceiver identifier device.

Identifier device 12 can make use of several computing and processing subcomponents. Turning to FIG. 4A, device 12 includes a central processing unit (CPU) 40 that is connected via a signal bearing medium to mass storage device 42, such as a hard drive or similar component. Onboard memory 44, such as electrically erasable programmable read only memory (EEPROM) or similar devices, is also connected. A communication port 46 allows device 12 to connect remotely to a communication network 48 via methods known in the art such as IEEE 802.xx and similar technologies. Communication network 48 can include local or wide area networks known in the art (LAN, WAN, etc.). Network 48 is shown coupled to remote computer systems 50, 52.

Figure 4B:
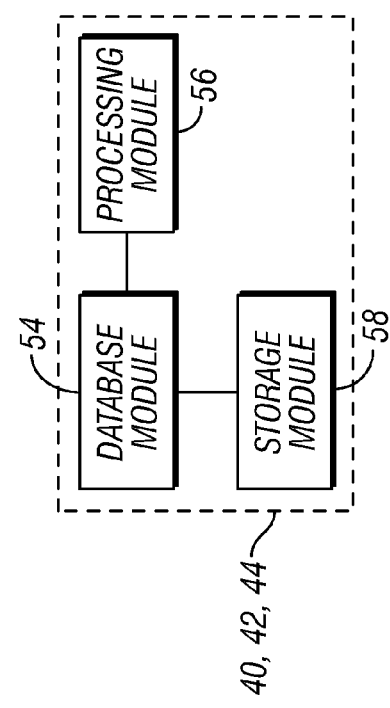
FIG. 4B illustrates exemplary software or firmware subcomponents executing on a transceiver identifier device.

Device 12 can incorporate a variety of firmware and software to perform specific functionality. An example can be found in FIG. 4B. Database module 54 can process database information in a variety of formats. For example, database module 54 can include relational databases known in the art. Database module 54 is shown connected to processing module 56 to execute computing tasks and to storage module 58, which implements storage and retrieval functionality. Again, as one skilled in the art will appreciate, a vast array of hardware, software, firmware and other components can be implemented to perform a specific task and adapted for a specific application.

Figure 5:
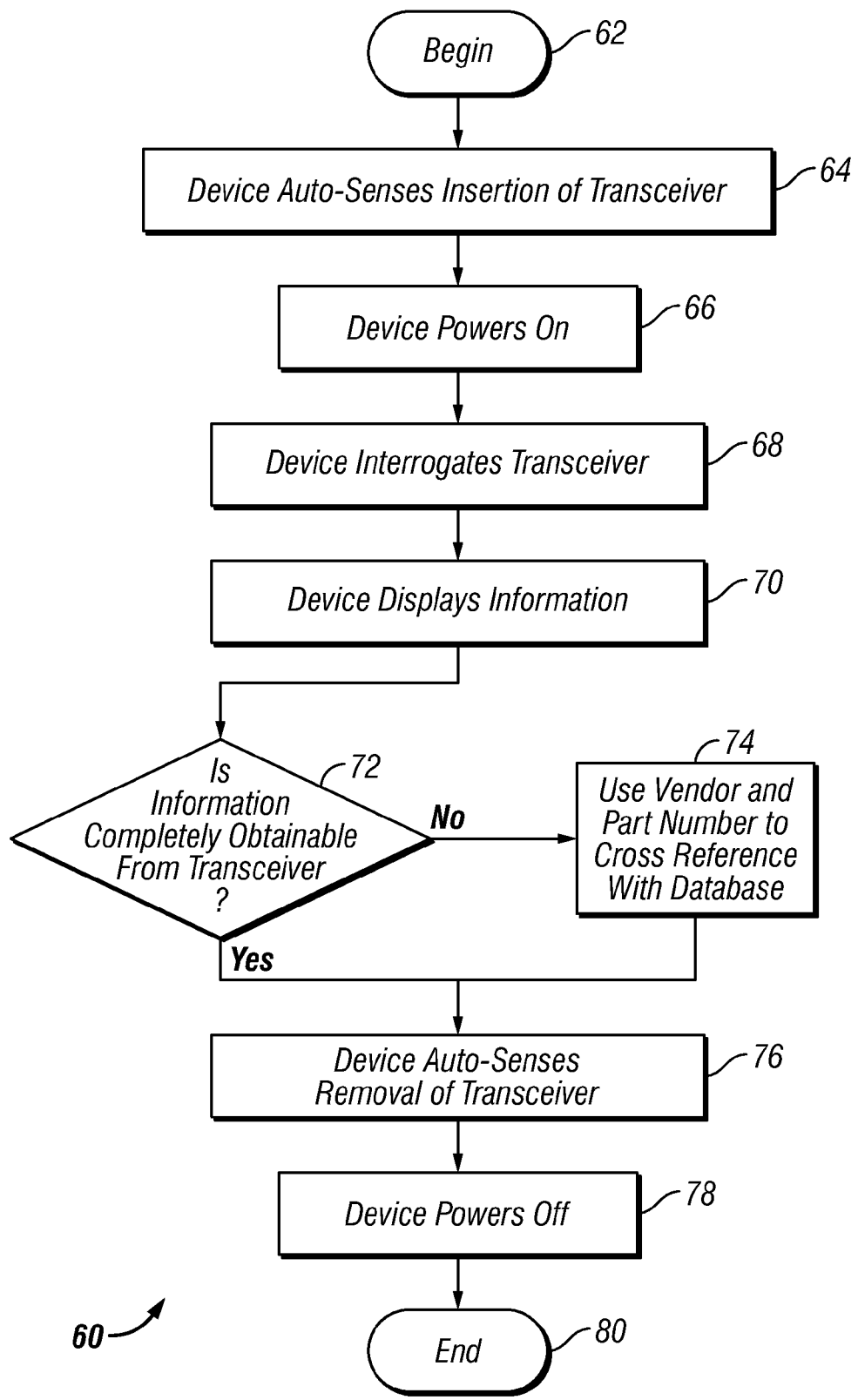
FIG. 5 illustrates an exemplary method of operation of a transceiver identifier device according to the present invention.

Turning to FIG. 5, an example method of operation of device 12, according to the present invention, is shown. Method 60 begins (step 62) by performing an auto-sensing function to detect the insertion of a transceiver (step 64). Once a user has inserted the transceiver 10, the device powers on (step 66). The device then interrogates the transceiver device to obtain all relevant specification information for the respective transceiver (step 68). Again, the specification information can include the information previously described.

As a next step, the device queries whether all of the desired information has been obtained from the transceiver device itself (step 72). For example, in some cases, a particular transceiver device may provide only a vendor and part number information. If additional information is still needed, the device can utilize database module 54 to cross reference the vendor and part number to auto-populate a database field with specification information. The additional specification information could be stored on mass storage device 42, memory 44, or elsewhere (for example, on a remote computer system 50, 52).

Once the relevant specification information is auto-populated, the information can be again displayed. Respective specification information can be manipulated and displayed by software to suit a particular application or a particular need of a user. As a next step, device 12 can auto-sense the removal of a transceiver (step 76). The device 12 can then power itself off (step 78). Method 60 then ends (step 80).

In certain embodiments, software, hardware, or firmware operating on identifying device 12 can interrogate a transceiver device 10 to, in effect, "test" the transceiver 10 to see if the transceiver device 10 is fully operational and/or satisfies certain testing criteria. Such hardware, software, or firmware components can be configured and adapted using methods known in the art.

Again, in general, software and/or hardware to implement various embodiments of the present invention, or other functions previously described, such as the described auto-sensing function, can be created using tools currently known in the art.

While one or more embodiments of the present invention have been illustrated in detail, the skilled artisan will appreciate that modifications and adaptations to those embodiments may be made without departing from the scope of the present invention as set forth in the following claims.

What is claimed is:

1. A hand held transceiver identifier device, comprising:
   a processor device contained in a housing;
   a storage device contained in the housing;
   a port contained in the housing to receive a transceiver, the transceiver comprising a copper transceiver device;
   a display contained in the housing comprising a touch screen display, wherein, upon insertion of the transceiver in the port, the hand held transceiver identifier device interrogates the transceiver to obtain specification information, and wherein the specification information includes vendor, part number, serial number, supported speed, wavelength, and supported maximum distance information; and wherein the touch screen display includes, via firmware operating on the handheld transceiver identifier device, a save-to-database button that, when pressed, saves the obtained specification information from the transceiver to a database module of the handheld transceiver identifier device; and
   the database module operating on the processor device, wherein, upon partial attainment of the specification information from the transceiver by the handheld transceiver identifier device, including at least the vendor and part number information, and upon determining that an additional part of the specification information is still needed as to satisfy a query of whether all desired specification information has been provided, the hand held transceiver identifier device utilizes the database module to cross reference the vendor and part number information obtained from the transceiver with stored data maintained in the storage device to obtain the additional part of the specification information to thereby present all the desired specification information on the display.

2. The device of claim 1, wherein the display includes a liquid crystal display (LCD) display.

3. The device of claim 1, wherein the port is compatible with a gigabit interface converter (GBIC), a small form factor pluggable (SFP), or an XFP standard.

4. The device of claim 1, wherein the database module auto-populates a database field shown on the display with the stored data.

5. The device of claim 1, further including a selection button integrated into a surface of the housing to perform a menu selection function.

6. A method of manufacturing a hand held transceiver identifier device, comprising:
   providing a processor device contained in a housing;
   providing a storage device contained in the housing;
   providing a port contained in the housing to receive a transceiver, the transceiver comprising a copper transceiver device;
   providing a display comprising a touch screen display contained in the housing, wherein, upon insertion of the transceiver in the port, the hand held transceiver identifier device interrogates the transceiver to obtain specification information, and wherein the specification information includes vendor, part number, serial number, supported speed, wavelength, and supported maximum distance information; and wherein the touch screen display includes, via firmware operating on the handheld transceiver identifier device, a save-to-database button that, when pressed, saves the obtained specification information from the transceiver to a database module of the handheld transceiver identifier device; and
   providing the database module operating on the processor device, wherein, upon partial attainment of the specification information from the transceiver by the handheld transceiver identifier device, including at least the vendor and part number information, and upon determining that an additional part of the specification information is still needed as to satisfy a query of whether all desired specification information has been provided, the hand held transceiver identifier device utilizes the database module to cross reference the vendor and part number information obtained from the transceiver with stored data maintained in the storage device to obtain the additional part of the specification information to thereby present all the desired specification information on the display.

7. The method of claim 6, wherein the display includes a liquid crystal display (LCD) display.

8. The method of claim 6, wherein the port is compatible with a gigabit interface converter (GBIC), a small form factor pluggable (SFP), or an XFP standard.

9. The method of claim 6, wherein the database module auto-populates a database field shown on the display with the stored data.

10. The method of claim 6, further including the step of providing a selection button integrated into a surface of the housing to perform a menu selection function.

* * * * *